United States Patent
Kim et al.

(10) Patent No.: US 8,164,710 B2
(45) Date of Patent: Apr. 24, 2012

(54) BACKLIGHT ASSEMBLY AND LIQUID CRYSTAL DISPLAY APPARATUS HAVING THE SAME

(75) Inventors: Dae-Won Kim, Ansan-si (KR);
Kyung-Nam Kim, Ansan-si (KR);
Jae-Jin Lee, Ansan-si (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 285 days.

(21) Appl. No.: 12/355,993

(22) Filed: Jan. 19, 2009

(65) Prior Publication Data
US 2010/0053504 A1 Mar. 4, 2010

(30) Foreign Application Priority Data

Sep. 4, 2008 (KR) .................. 10-2008-0087092
Sep. 6, 2008 (KR) .................. 10-2008-0087991

(51) Int. Cl.
*G02F 1/1335* (2006.01)

(52) U.S. Cl. ........................................ 349/65

(58) Field of Classification Search .................. None
See application file for complete search history.

(56) References Cited

U.S. PATENT DOCUMENTS

| | | | | |
|---|---|---|---|---|
| 2008/0123023 | A1* | 5/2008 | Doan et al. ...................... | 349/70 |
| 2009/0290088 | A1* | 11/2009 | Kwak .............................. | 349/58 |
| 2009/0316068 | A1* | 12/2009 | Shimizu et al. ................ | 349/61 |
| 2010/0296024 | A1* | 11/2010 | Ishimaru et al. ............... | 349/61 |

\* cited by examiner

*Primary Examiner* — Sung Pak
(74) *Attorney, Agent, or Firm* — H.C. Park & Associates, PLC

(57) ABSTRACT

A backlight assembly includes a light guide plate and a light-emitting module. The light guide plate guides light. The light-emitting module is disposed to face an incidence surface of the light guide plate. The light-emitting module includes a printed circuit board (PCB) vertically disposed to face the incidence surface and a plurality of LEDs mounted on the PCB to emit light toward the incidence surface. Each of the LEDs includes a blue chip emitting blue light, a red fluorescent substance and a green fluorescent substance for converting the blue light into white light. Therefore, a thickness of the backlight assembly is reduced and an LED-mounting stability of the LED is improved.

20 Claims, 4 Drawing Sheets

BACKLIGHT ASSEMBLY AND LIQUID CRYSTAL DISPLAY APPARATUS HAVING THE SAME

PRIORITY STATEMENT

This application claims priority under 35 USC §119 to Korean Patent Application No. 2008-87092, filed on Sep. 4, 2008 and Korean Patent Application No. 2008-87991, filed on Sep. 6, 2008 in the Korean Intellectual Property Office (KIPO), the contents of which are herein incorporated by reference in their entirety.

BACKGROUND OF THE INVENTION

1. Field of the Invention

Example embodiments of the present invention relate to a backlight assembly and a liquid crystal display apparatus having the backlight assembly. More particularly, example embodiments of the present invention relate to a backlight assembly having a plurality of light emitting diodes and a liquid crystal display apparatus having the backlight assembly.

2. Description of the Related Art

In general, a liquid crystal display (LCD) apparatus, which is one of flat panel display apparatuses, displays an image by using liquid crystal. The LCD apparatus has merits such as thin thickness, light weight, low driving voltage, low power consumption, etc. comparing with a cathode ray tube (CRT), a plasma display panel (PDP), etc, so that the LCD apparatus is widely used in various fields.

The LCD apparatus employs an LCD panel and a backlight assembly providing the LCD panel with light, since the LCD panel does not emit light by itself A conventional backlight assembly employs a cold cathode fluorescent lamp (CCFL) as a light source. However, a light emitting diode (LED) is increasingly employed by a backlight assembly, since the LED has good color reproducibility and low power consumption comparing the CCFL.

Especially, a backlight assembly employed by a small or middle size device such as a mobile phone, a notebook computer, etc. includes a light guide plate for guiding light toward an LCD panel, and a light-emitting module disposed at a side of the light guide plate to provide the light guide plate with light. The light-emitting module includes a printed circuit board disposed in parallel with a light-exiting surface of the light guide plate, and a side-illumination type LED mounted on the printed circuit board to provide the light guide plate with light through side surface of the light guide plate. The side-illumination type LED generates white light by using a blue chip and yellow fluorescent substances, or by using a blue chip, a green chip and a red chip.

However, the side-illumination type LED has different orientation angles along a vertical direction and along a horizontal direction to lower a light-using efficiency. Additionally, the printed circuit board is disposed over the light guide plate or under the light guide plate to increase total thickness of the backlight assembly.

SUMMARY OF THE INVENTION

Example embodiments of the present invention provide a backlight assembly capable of enhancing color reproducibility and LED-mounting stability without increasing thickness thereof.

Example embodiments of the present invention also provide an LCD apparatus having the backlight assembly.

According to one aspect of the present invention, the backlight assembly includes a light guide plate and a light-emitting module. The light guide plate guides light. The light-emitting module is disposed to face an incidence surface of the light guide plate. The light-emitting module includes a printed circuit board (PCB) vertically disposed to face the incidence surface and a plurality of LEDs mounted on the PCB to emit light toward the incidence surface. Each of the LEDs includes a blue chip emitting blue light, a red fluorescent substance and a green fluorescent substance for converting the blue light into white light.

For example, the PCB may have a width that is substantially equal to or less than a height of the incidence surface of the light guide plate. The LED may have a size substantially equal to or smaller than a width of the PCB.

The red fluorescent substance may include one or more substances selected from the group consisting of SrS:Eu, (Sr,Ca)S:Eu, CaS:Eu, (Sr,Ca)GeS:Eu and CaAlSiN$_3$.

The green fluorescent substance may include one or more substances selected from the group consisting of SrGa$_2$S$_4$:Eu and (Ba,Sr,Ca)$_2$SiO$_4$:Eu.

The LEDs may be arranged along a longitudinal direction of the PCB.

Each of the LEDs may include a lead frame electrically connected to the PCB for applying electric power to the blue chip, and a housing covering portions of the lead frame. The housing has an opening portion exposing the blue chip, and the opening portion is filled with a molding substance mixed with the red fluorescent substance and the green fluorescent substance.

The lead frame may include a chip-mounting portion, on which the blue chip is mounted, a side portion extended from the chip-mounting portion to be disposed at a side face of the housing, and a lower portion extended from the side portion and bent to be disposed at a bottom face of the housing, the lower portion being larger than the side portion in area.

According to another aspect of the present invention, the backlight assembly includes a light guide plate and a light-emitting module. The light guide plate guides light. The light-emitting module is disposed to face an incidence surface of the light guide plate. The light-emitting module includes a PCB and a plurality of LEDs mounted on the PCB to emit light toward the incidence surface of the light guide plate. Each of the LEDs has a light-emitting chip, a lead frame electrically connected to the PCB for applying electric power to the light-emitting chip, and a housing covering the lead frame and having an opening portion exposing the light-emitting chip. The lead frame has a chip-mounting portion on which the blue chip is mounted, a side portion extended from the chip-mounting portion to be disposed at a side face of the housing, and a lower portion extended from the side portion and bent to be disposed at a bottom face of the housing. The lower portion is larger than the side portion in area.

For example, the light-emitting chip is a blue chip generating blue light, and the LED further includes yellow fluorescent substance in the opening portion, which converts a portion of the blue light generated by the light-emitting chip into yellow light. The yellow fluorescent substance may include one or more substances selected from the group consisting of the YAG series, silicate series and TAG series.

Alternatively, the light-emitting chip is a blue chip generating blue light, and the LED further include a red fluorescent substance and a green fluorescent substance in the opening portion, the red fluorescent substance converting a portion of the blue light into red light and the green fluorescent substance converting a portion of the blue light into green light so that white light is generated by mixing the blue light, the red light and the green light. The red fluorescent substance may include one or more substances selected from the group consisting of SrS:Eu, (Sr,Ca)S:Eu, CaS:Eu, (Sr,Ca)GeS:Eu and CaAlSiN$_3$. The green fluorescent substance may include one or more substances selected from the group consisting of SrGa$_2$S$_4$:Eu and (Ba,Sr,Ca)$_2$SiO$_4$:Eu.

The PCB is vertically disposed to face the incidence surface and the light-emitting chip emits light toward the incidence surface. The PCB may have a width that is substantially equal to or less than a height of the incidence surface of the light guide plate. The LED may have a size substantially equal to or smaller than a width of the PCB. The LEDs may be arranged along a longitudinal direction of the PCB.

The lower portion of the lead frame may have an area of about 20%~70% of a total area of the bottom surface of the housing.

According to still another aspect of the present invention, a liquid crystal display (LCD) apparatus includes a display unit and a backlight assembly. The display unit includes an LCD panel displaying an image. The backlight assembly provides the LCD panel with light. The backlight assembly includes a light guide plate and a light-emitting module. The light guide plate guides light. The light-emitting module is disposed to face an incidence surface of the light guide plate. The light-emitting module includes a printed circuit board (PCB) vertically disposed to face the incidence surface and a plurality of LEDs mounted on the PCB to emit light toward the incidence surface. Each of the LEDs includes a blue chip emitting blue light, a red fluorescent substance and a green fluorescent substance for converting the blue light into white light.

According to still another aspect of the present invention, a liquid crystal display (LCD) apparatus includes a display unit and a backlight assembly. The display unit includes an LCD panel displaying an image. The backlight assembly provides the LCD panel with light. The backlight assembly includes a light guide plate and a light-emitting module. The light guide plate guides light. The light-emitting module is disposed to face an incidence surface of the light guide plate. The light-emitting module includes a PCB and a plurality of LEDs mounted on the PCB to emit light toward the incidence surface of the light guide plate. Each of the LEDs has a light-emitting chip, a lead frame electrically connected to the PCB for applying electric power to the light-emitting chip, and a housing covering the lead frame and having an opening portion exposing the light-emitting chip. The lead frame has a chip-mounting portion on which the blue chip is mounted, a side portion extended from the chip-mounting portion to be disposed at a side face of the housing, and a lower portion extended from the side portion and bent to be disposed at a bottom face of the housing. The lower portion is larger than the side portion in area.

According to the backlight assembly and the LCD apparatus having the backlight assembly, the light-emitting module including a top-illumination type LED with same orientation angles along vertical and horizontal directions is disposed on the printed circuit board to face the incidence surface of the light guide plate. Therefore, a thickness of the backlight assembly is reduced and light-using efficiency is improved. Additionally, the lead frame is formed such that a lower portion has a larger area than a side portion. Therefore, a mounting-stability of LED is improved. Furthermore, color reproducibility is improved by using the blue chip with red and green fluorescent substances.

BRIEF DESCRIPTION OF THE DRAWINGS

The above and other features and advantages of the present invention will become more apparent by describing in detailed example embodiments thereof with reference to the accompanying drawings.

DETAILED DESCRIPTION OF THE INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on,""connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or"includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper"and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises"and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
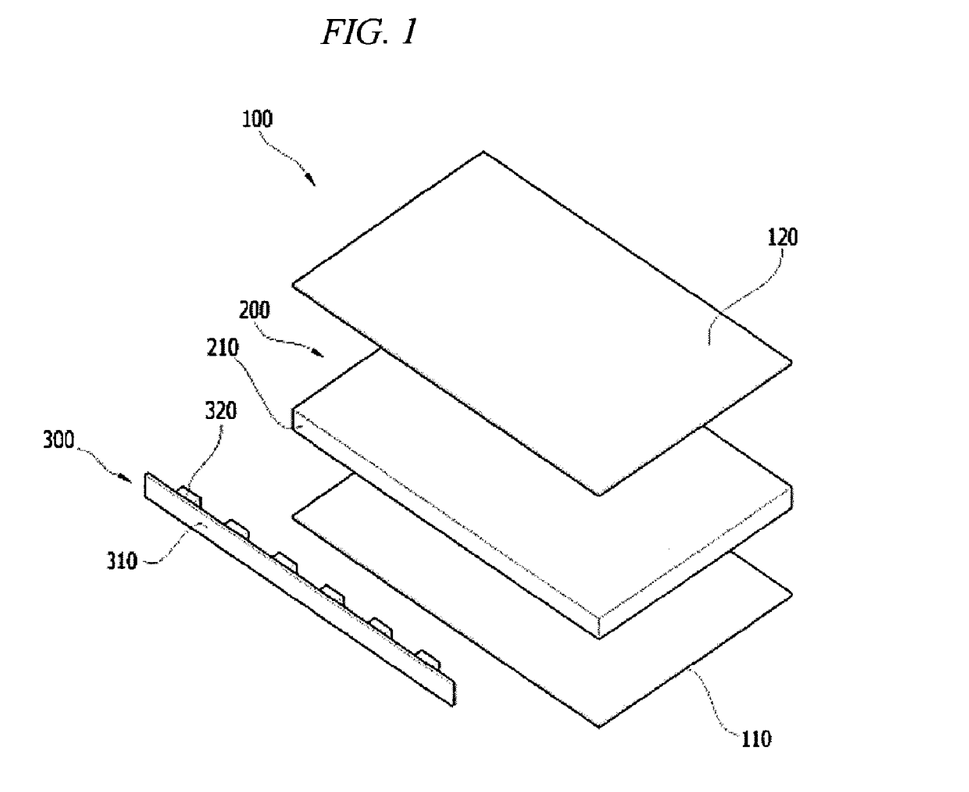
FIG. 1 is an exploded perspective view illustrating a backlight assembly according to an exemplary embodiment of the present invention.
Figure 2:
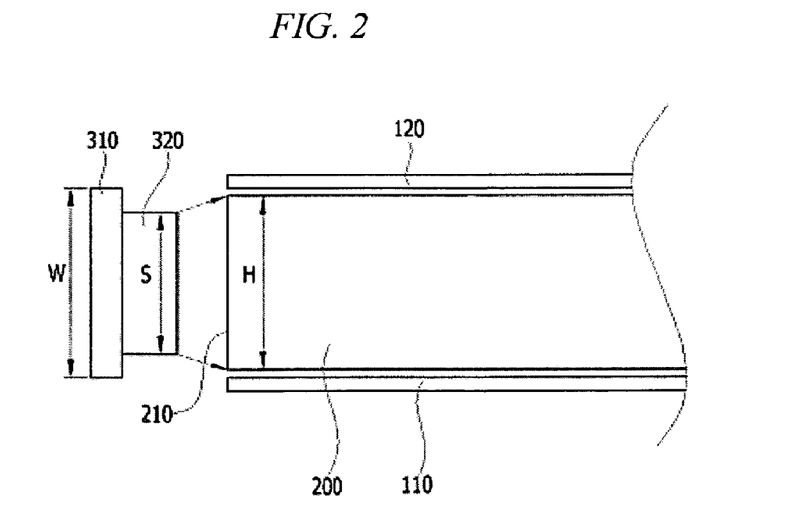
FIG. 2 is a cross-sectional view illustrating the backlight assembly in FIG. 1, which is assembled.

FIG. 1 is an exploded perspective view illustrating a backlight assembly according to an exemplary embodiment of the present invention. FIG. 2 is a cross-sectional view illustrating the backlight assembly in FIG. 1, which is assembled, and FIG. 3 is a perspective view illustrating a light-emitting module in FIG. 1.

Figure 3:
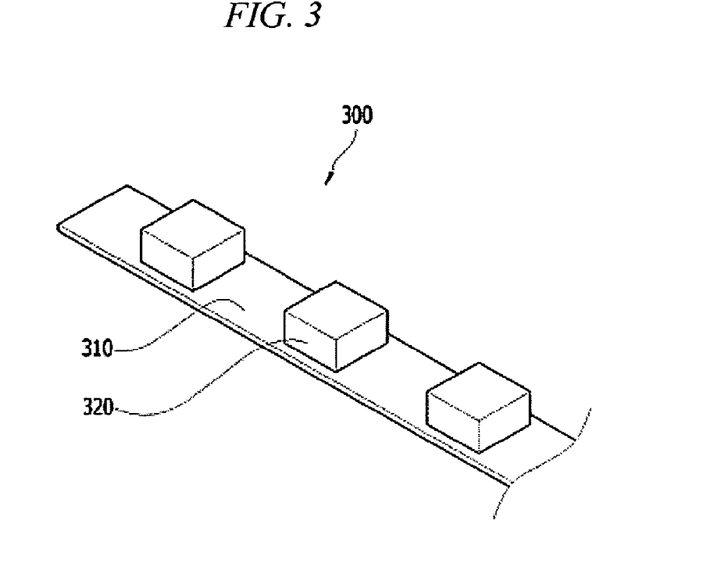
FIG. 3 is a perspective view illustrating a light-emitting module in FIG. 1.

Referring to FIGS. 1, 2 and 3, a backlight assembly 100 according to an exemplary embodiment of the present invention includes a light guide plate 200 guiding light and a light-emitting module 300 providing the light guide plate 200 with light.

The light-emitting module 300 is disposed to face a side surface of the light guide plate 200, which corresponds to an incidence surface 210, to provide the light guide plate 200 with light. The light-emitting module 300 includes a printed circuit board (PCB) 310 and a plurality of LEDs 320 mounted on the PCB 310.

The PCB 310 fixes a position of the LEDs 320, and provides LEDs 320 with electric power. The PCB 310 is disposed substantially vertically to face the incidence surface 210 of the light guide plate 200. The PCB 310 has metal patterns formed on a surface of the PCB 310 to provide the LEDs 320 with electric power.

The PCB 310 has a rectangular shape corresponding to the incidence surface 210 of the light guide plate 200. A width W of the PCB 310 corresponding to a height H of the incidence surface 210 of the light guide plate 200, is substantially equal to or smaller than the height H of the incidence surface 210 of the light guide plate 200. When the width W of the PCB 310 is substantially equal to or smaller than the height H of the incidence surface 210 of the light guide plate 200, a total thickness of the backlight assembly 100 is not increased. A length of the PCB 310, which corresponds to a length of the incidence surface 210 of the light guide plate 200, is substantially equal to or less than the length of the incidence surface 210 of the light guide plate 200.

The LEDs 320 are arranged in a line along the lengthwise direction of the PCB 310. The LEDs 320 are mounted on a surface of the PCB 310, which faces the incidence surface 210 of the light guide plate 200 to emit light along a direction substantially perpendicular to the surface of the PCB 310 in response to electric power provided through the PCB 3 10. Therefore, the light emitted from the LEDs 320 enters the light guide plate 200 through the incidence surface 210.

In order to improve light-using efficiency and reduce a thickness of the backlight assembly 100, the LED 320 is formed to have smaller size than a width W of the PCB 310. The light emitted from the LED 320 has same orientation angles along vertical and horizontal directions. For example, the orientation angle is about 120°. Therefore, the light-emitting module 300 employing the top-illumination type LED provides the incidence surface 210 of the light guide plate 200 with more uniform light, comparing with a conventional light-emitting module employing a side-illumination type LED having a smaller orientation angle along a vertical direction than an orientation angle along a horizontal direction.

Figure 4:
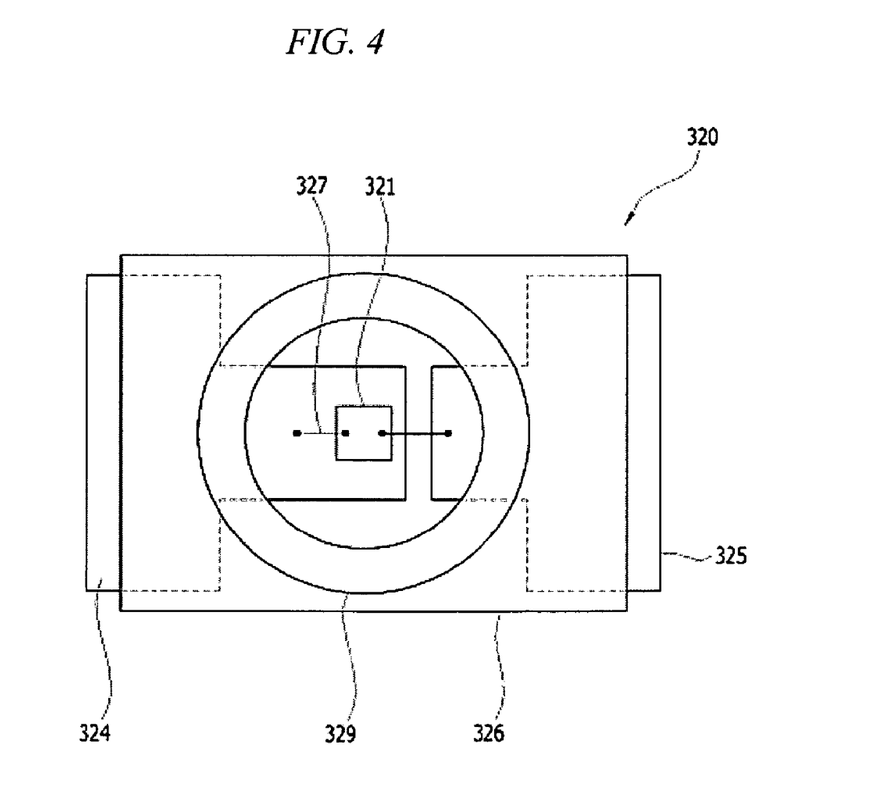
FIG. 4 is a plain view illustrating a top-illumination type LED in FIG. 3.
Figure 5:
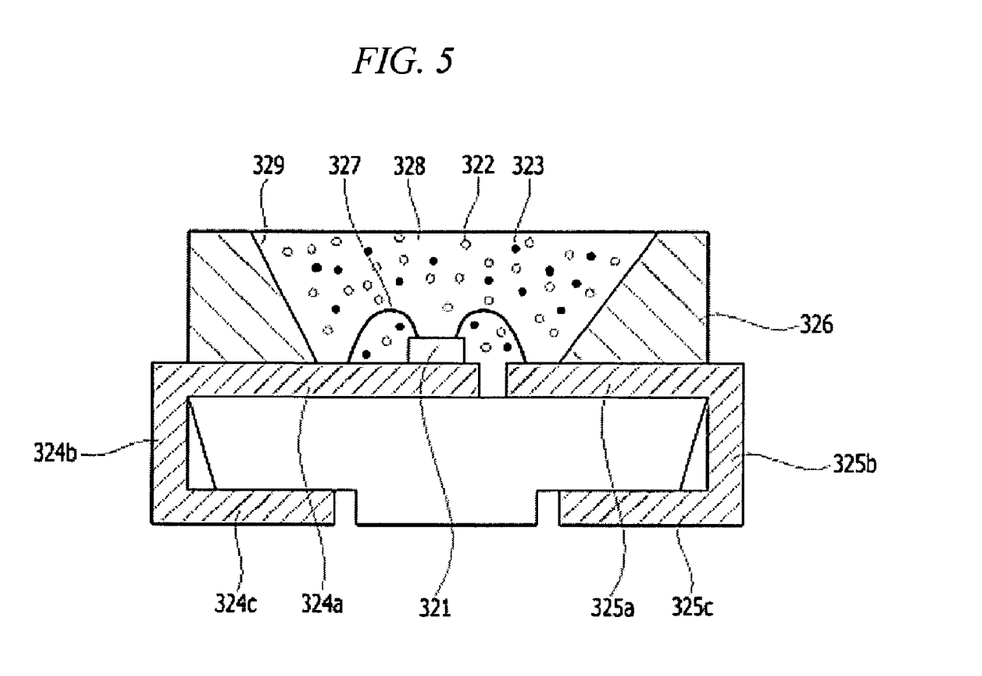
FIG. 5 is a cross-sectional view illustrating the top-illumination type LED in FIG. 4.

FIG. 4 is a plain view illustrating a top-illumination type LED in FIG. 3, and FIG. 5 is a cross-sectional view illustrating the top-illumination type LED in FIG. 4.

Referring to FIGS. 3, 4 and 5, the LED 320 according to an exemplary embodiment of the present invention includes a light-emitting chip 321, lead frames 324 and 325 electrically connected to the PCB 310 to provide the light-emitting chip 321 with electric power and a housing 326 for embodying a top-illumination type package.

The lead frames 324 and 325 support the light-emitting chip 321, and provide the light-emitting chip 321 with electric power from the PCB 310 to drive the light-emitting chip 321. The lead frames 324 and 325 include metal of high conductivity. The lead frames 324 and 325 include the first lead electrode 324 and the second lead electrode 325 separated from each other to be electrically insulated from each other. The first lead electrode 324 is electrically connected to the light-emitting chip 321 through a conductive wire 327 or a conductive adhesive, and the second lead electrode 325 is electrically connected to the light-emitting chip 321 through a conductive wire 327. Each of the first lead electrode 324 and the second lead electrode 325 are bent to have U-shape, and portions of the first lead electrode 324 and the second lead electrode 325 are exposed from the housing 326 to be electrically connected to the PCB 3 10.

In detail, the lead frames 324 and 325 has a chip-mounting portion 324a and 325a on which the light-emitting chip 321 is mounted, side portions 324b and 325b extended from the chip-mounting portion 324a and 325a to be exposed from sides of the housing 326, and lower portions 324c and 325c extended from the side portions 324b and 325b to face the chip-mounting portion 324a and 325a and exposed from bottoms of the housing 326. For example, the lower portions 324c and 325c have an area of about 20%~70% of total lower surface area of the housing 326. The side portions 324b and 325b may have an area of about 20%~70% of side area of the housing 326. When the LED 320 having above-described structure is soldered to be attached to the PCB 310, portions of side portions 324b and 325b and lower portions 324c and 325c of the lead frame 324 and 325 are fixed to the PCB 310 by soldering. In this case, the LED 320 soldered to the PCB 310 may have got loose or be slant from the PCB 310 by an external impact. Therefore, in order to prevent such badness described above, the lower portions 324c and 325c of the lead frame 324 and 325 has larger area than the area of the side portions 324b and 325b. For example, the width of the side portions 324b and 325b may be smaller than the width of the lower portions 324c and 325c, or side portions 324b and 325b may have an opening formed at a center portion thereof, so that an area of the side portions 324b and 325b may be smaller than the area of the lower portions 324c and 325c.

As described above, when the area of the lower portions 324c and 325c is larger than the area of the side portions 324b and 325b, the center of mass of the LED 320 approaches to the lower portions 324c and 325c, so that getting loose or being slant of the LED 320 induced by an external impact may be reduced. Therefore, a mounting-stability of the LED 320 may be enhanced. The lower portions 324c and 325c of the lead frame 324 and 325 may be equal to, larger than or smaller than the chip-mounting portion 324a and 325a in area.

The light-emitting chip 321 may be a blue chip generating blue light. Then, the LED 320 may include red fluorescent substance 322 and green fluorescent substance 323 converting the blue light generating by the light-emitting chip 321 into red light and green light, respectively to generating white light.

The light-emitting chip 321 is mounted on the first lead electrode 324, and generates blue light of which wave length is in a range of about 430 nm~ 470 nm in response to electric power provided from the first lead electrode 324 and the second lead electrode 325. The light-emitting chip 321 may be, for example, an LED chip with InGaN. The light-emitting chip 321 may be electrically connected to the first lead electrode 324 and the second lead electrode 325 through a conductive wire 327. Alternatively, the light-emitting chip 321 may be electrically connected to the first lead electrode 324 through a conductive adhesive.

The red fluorescent substance 322 and green fluorescent substance 323 are mixed with a molding substance 328 to be filled in an opening portion 329 of the housing 326. The molding substance 328 includes, for example, epoxy resin. The red fluorescent substance 322 is excited by blue light generated by the light-emitting chip 321 to emit red light. The red fluorescent substance 322 includes, for example, inorganic compound or solid solution having similar crystal structure to that of SrS:Eu, (Sr,Ca)S:Eu, CaS:Eu, (Sr,Ca)GeS:Eu and CaAlSiN$_3$. The green fluorescent substance 323 is excited by blue light generated by the light-emitting chip 321 to emit green light. The green fluorescent substance 323 includes, for example, SrGa$_2$S$_4$:Eu, (Ba,Sr,Ca)$_2$SiO$_4$:Eu, etc. Therefore, the LED 320 emits white light in which the blue light generated by the light-emitting chip 321, the red light emitted by the red fluorescent substance 322, and green light emitted by the green fluorescent substance 323 are mixed with each other.

As described above, when white light is generated by using the light-emitting chip 321 generating blue light, the red fluorescent substance 322 and the green fluorescent substance 323, a color reproducibility of about 90~110 may be obtained, which is improved by about 20% comparing with an LED having a blue chip and yellow fluorescent substance to have color reproducibility of about 85.

The housing 326 covers portions of the first lead electrode 324 and the second lead electrode 325 to fix the first lead electrode 324 and the second lead electrode 325. The housing 326 has an opening portion 329 exposing the light-emitting chip 321 and receiving molding substance 328, in which the red fluorescent substance 322 and the green fluorescent substance 323 distributed. The housing 326 may be formed through molding process using for example, polyphthalamide (PPA) resin.

The opening portion 329 of the housing 326 has a circular shape when viewed on a plane as shown in FIG. 4. In detail, the opening portion 329 has a truncated cone shape with a circle having a shortest radius in a region adjacent to the lead frame 324 and 325. Therefore, an inner wall portion of the housing 326, which corresponds to the opening portion 329, is slant surface. The orientation angle of light emitted from the LED 320 depends on the shape of the opening portion 329 of the housing 326. Therefore, when the opening portion 329 has a truncated cone shape as described in the present embodiment, orientation angles along all direction becomes the same. Furthermore, the orientation angle may be adjusted by adjusting the angle of side of the opening portion 329 having a truncated cone shape. For example, the side of opening portion 329 is adjusted so that the orientation angle is about 120°. The size of the package of the LED 320 should be smaller than a thickness of the light guide plate 200. Therefore, in order to reduce the size of the package, the opening portion 329 may have an oval shape with short axis along a vertical direction.

Figure 6:
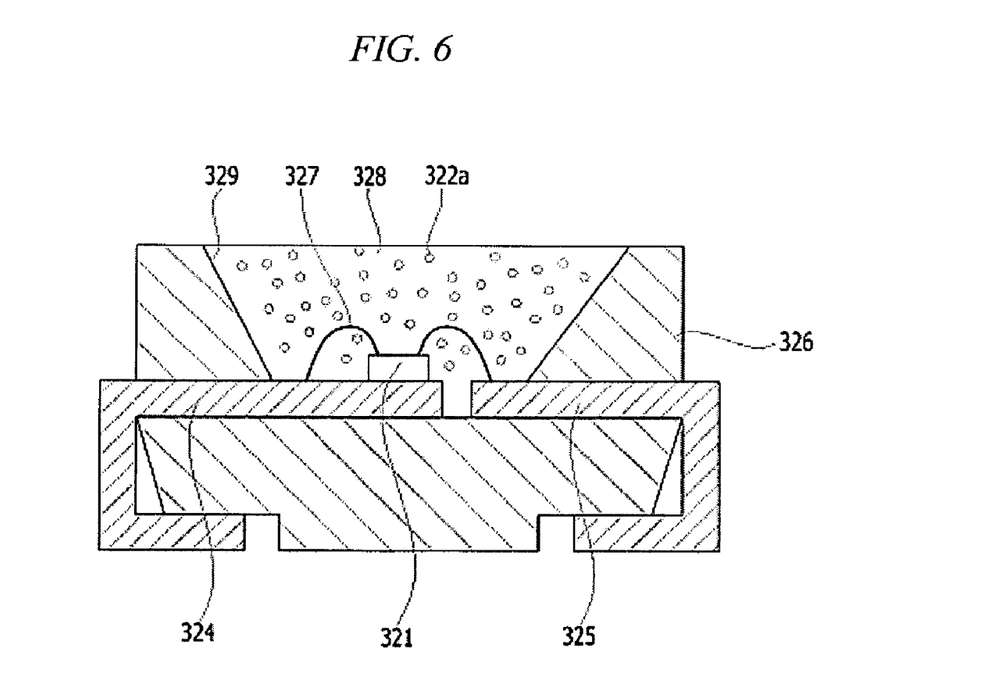
FIG. 6 is a cross-sectional view illustrating an LED according to another exemplary embodiment of the present invention.

FIG. 6 is a cross-sectional view illustrating an LED according to another exemplary embodiment of the present invention. The LED in FIG. 6 is substantially the same as the LED in FIG. 5 except for fluorescent substance. Therefore, same reference numerals will be used to refer to the same elements, and further explanation will be omitted.

Referring to FIG. 6, the LED 320 includes yellow fluorescent substance 322a instead of the red fluorescent substance and the green fluorescent substance. The yellow fluorescent substance 322a converts a portion of blue light generated by the light-emitting chip 321 into yellow light. The yellow fluorescent substance 322a is mixed with molding substance 328 to be filled in opening portion 329 of the housing 326. The yellow fluorescent substance 322a is excited by a portion of blue light generated by the light-emitting chip 321 to emit yellow light. The yellow fluorescent substance 322a includes, for example, yttrium aluminum garnet (Y$_3$Al$_5$O$_{12}$; YAG) series, silicate series or TAG series. Therefore, the LED 320 emits white light in which blue light generated by the light-emitting chip 321 and yellow light emitted from the yellow fluorescent substance 322a are mixed.

Referring again to FIGS. 1 and 2, the light guide plate 200 guides light generated by the light-emitting module 300 disposed adjacent to the light guide plate 200 toward the LCD panel disposed over the light guide plate 200. The light guide plate 200 includes optically transparent substrate for reducing light loss. The light guide plate 200 includes, for example, optically transparent polymethylmethacrylate (PMMA) or polycarbonate (PC).

The light guide plate 200 may have light-reflecting patterns (not shown) formed on a bottom surface of the light guide plate 200 for light diffusing and reflecting. For example, the light-reflecting patterns formed on the bottom surface of the light guide plate 200 may have printed patterns or embossing patterns. Therefore, light entering the light guide plate 200 from the light-emitting module 300 may be diffused and reflected by the light-reflecting pattern, and light, which advances toward light guide plate 200 with smaller angle than the critical angle, exits the light guide plate 200 through a top surface of the light guide plate 200.

The light guide plate 200 may have a plate-shape of which thickness is uniform along a direction from the incidence surface 210 adjacent to the light-emitting module 300 to an opposite surface that is opposite to the incidence surface 210, or a wedge shape of which thickness is decreased along a direction from the incidence surface 210 to the opposite surface.

The backlight assembly 100 may further include a light-reflecting sheet 110 disposed under the light guide plate 200. The light-reflecting sheet 110 reflects light which exits the light guide plate 200 through a bottom surface of the light guide plate 200 toward the light guide plate 200 to improve light-using efficiency. The light-reflecting sheet 110 includes, for example, polyethyleneterephthalate (PET) or polycarbonate (PC).

The backlight assembly 100 may further include at least one optical sheet 120 disposed over the light guide plate 200. The optical sheet 120 may include at least one of a light-diffusing sheet diffusing light to improve luminance uniformity, a light-condensing sheet condensing light to improve front-view luminance, a reflective polarization sheet for improving luminance through light-recycling.

Figure 7:
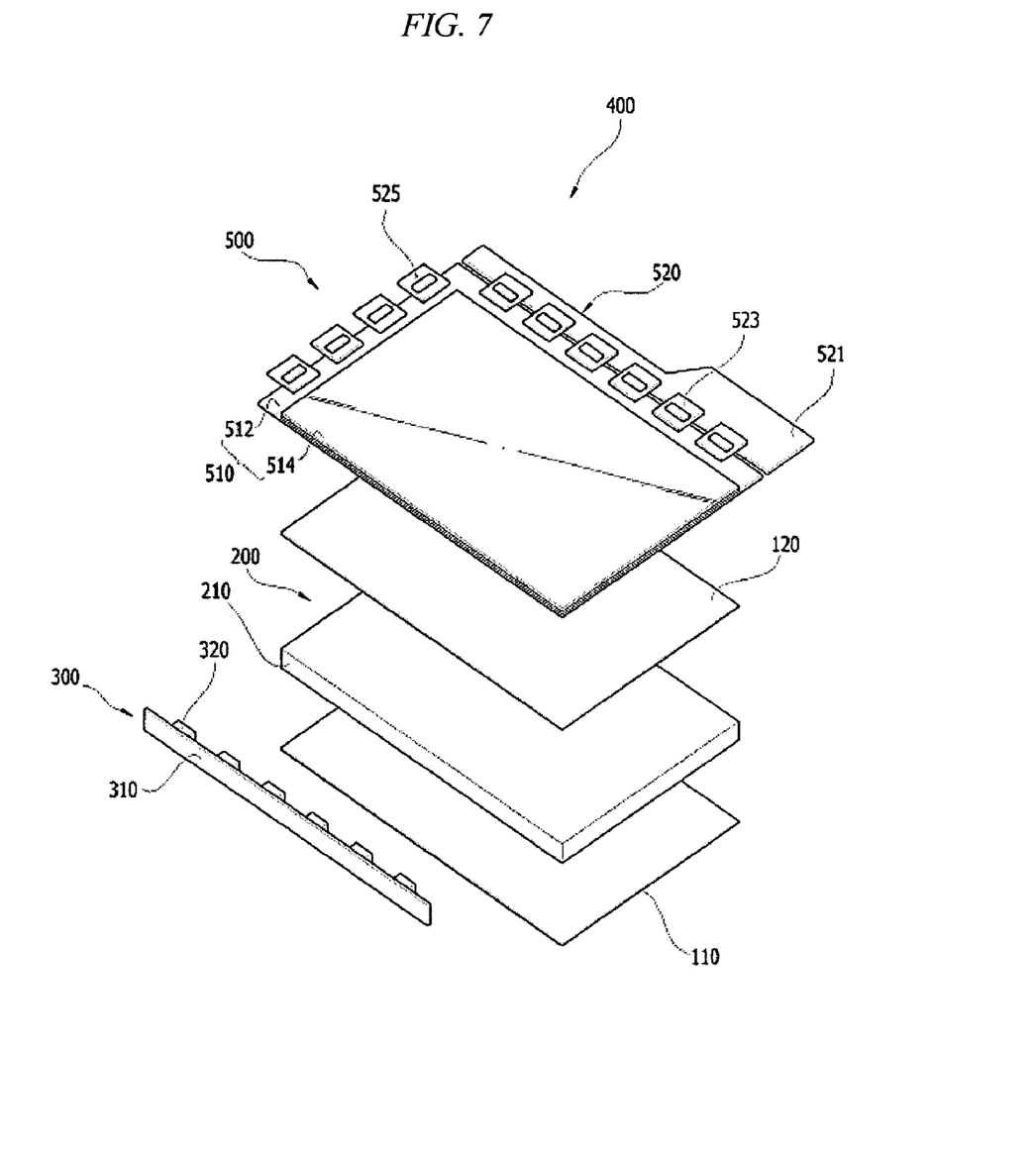
FIG. 7 is an exploded perspective view illustrating an LCD apparatus according to an exemplary embodiment of the present invention.

FIG. 7 is an exploded perspective view illustrating an LCD apparatus according to an exemplary embodiment of the present invention.

Referring to FIG. 7, an LCD apparatus 400 according to an exemplary embodiment of the present invention includes a display unit 500 and a backlight assembly 100. The display unit 500 includes an LCD panel 510 displaying an image. The backlight assembly 100 provides the LCD panel 510 with light.

The backlight assembly 100 may have the same structure in FIGS. 1 through 6. Thus, explanation regarding the backlight assembly 100 will be omitted.

The display unit 500 includes the LCD panel 510 displaying an image and a driving circuit section 520 driving the LCD panel 5 10.

The LCD panel 510 may include a first substrate 512, a second substrate 514 opposite to the first substrate 512 and a liquid crystal layer (not shown) disposed between the first and second substrates 512 and 514.

The first substrate 512 is a TFT substrate on which thin film transistors (TFTs) are arranged in a matrix shape. Each of the TFTs includes a source electrode electrically connected to a data line, a gate electrode electrically connected to a gate line, and a drain electrode electrically connected to a pixel electrode including optically transparent and electrically conductive material.

The second substrate 514 is a color filter substrate including RGB color filter for displaying a color image. The second substrate 514 includes a common electrode including optically transparent and electrically conductive material. Alternatively, the RGB color filter may be formed on the first substrate 512.

When the gate electrode of the TFT receives a gate driving signal to turn on the TFT, a data signal is applied to the pixel electrode to generate electric field between the pixel electrode and the common electrode. The electric field rearranges liquid crystal molecules of the liquid crystal layer disposed between the first substrate 512 and the second substrate 514 to change optical transmissivity to display grey level.

The driving circuit section 520 may include a source PCB 521 outputting various control signals for driving the LCD panel 510, a data driving circuit film 523 connecting the source PCB 521 and the LCD panel 510 and a gate driving circuit film 525 connected to the LCD panel 510.

The data driving circuit film 523 is connected to a data line of the first substrate 512, and the gate driving circuit film 525 is connected to a gate line of the first substrate 512. The data driving circuit film 523 and the gate driving circuit film 525 may include data driving chip and gate driving chip outputting driving signals for driving the LCD panel 510 in response to the control signal provided by the source PCB 521, respectively. The data driving circuit film 523 and the gate driving circuit film 525 may be embodied by for example, a tape carrier package (TCP) or a chip on film (COF). The driving circuit section 520 may further include a gate PCB (not shown) connected with the gate driving circuit film 525. However, when the gate driving chip is directly mounted on the first substrate 512, or when gate driving circuit is directly formed on the first substrate 512, the gate driving circuit film 525 may be omitted.

According to the backlight assembly and the LCD apparatus having the backlight assembly, the light-emitting module adjacent to the side of the light guide plate is disposed such that the PCB faces the light guide plate, and the LEDs are mounted on the PCB such that the LEDs emits light along a direction substantially perpendicular to the PCB. Therefore, the thickness of the backlight assembly may be reduced. Furthermore, the LED has the same orientation angles along a horizontal direction and a vertical direction to enhance light-using efficiency. Additionally, the lead frame has larger lower portions than the side portions in area, so that the mounting-stability of the LED is improved.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A backlight assembly comprising:
   a light guide plate; and
   a light-emitting module disposed to face an incidence surface of the light guide plate, the light-emitting module including a printed circuit board (PCB) vertically disposed to face the incidence surface and a plurality of light-emitting diodes (LEDs) mounted on the PCB to emit light toward the incidence surface, each of the LEDs including a blue chip to emit blue light, and a red fluorescent substance and a green fluorescent substance to convert the blue light into white light,
   wherein light emitted from the LEDs is directly incident on the entire incidence surface of the light guide plate in at least a vertical direction.

2. The backlight assembly of claim 1, wherein the PCB has a width that is substantially equal to or less than a height of the incidence surface of the light guide plate.

3. The backlight assembly of claim 2, wherein the LED has a size substantially equal to or smaller than a width of the PCB.

4. The backlight assembly of claim 1, wherein the red fluorescent substance comprises one or more substances selected from the group consisting of SrS:Eu, (Sr,Ca)S:Eu, CaS:Eu, (Sr,Ca)GeS:Eu and CaAlSiN$_3$.

5. The backlight assembly of claim 1, wherein the green fluorescent substance comprises one or more substances selected from the group consisting of SrGa$_2$S$_4$:Eu and (Ba,Sr,Ca)$_2$SiO$_4$:Eu.

6. The backlight assembly of claim 1, wherein the LEDs are arranged along a longitudinal direction of the PCB.

7. The backlight assembly of claim 1, wherein each of the LEDs comprises:

a lead frame electrically connected to the PCB to apply electric power to the blue chip; and a housing covering portions of the lead frame, the housing having an opening portion exposing the blue chip, the opening portion being filled with a molding substance mixed with the red fluorescent substance and the green fluorescent substance.

8. The backlight assembly of claim 7, wherein the lead frame comprises:

a chip-mounting portion, on which the blue chip is mounted;

a side portion extended from the chip-mounting portion to be disposed at a side face of the housing; and a lower portion extended from the side portion and bent to be disposed at a bottom face of the housing, the lower portion being larger than the side portion in area.

9. A backlight assembly comprising:

a light guide plate; and a light-emitting module disposed to face an incidence surface of the light guide plate, the light-emitting module including a PCB and a plurality of light-emitting diodes (LEDs) mounted on the PCB to emit light toward the incidence surface of the light guide plate, wherein each of the LEDs has a light-emitting chip, a lead frame electrically connected to the PCB to apply electric power to the light-emitting chip, and a housing covering the lead frame and having an opening portion exposing the light-emitting chip, and the lead frame has a chip-mounting portion on which the blue chip is mounted, a side portion extended from the chip-mounting portion to be disposed at a side face of the housing, and a lower portion extended from the side portion and bent to be disposed at a bottom face of the housing, the lower portion being larger than the side portion in area, wherein light emitted from the LEDs is directly incident on the entire incidence surface of the light guide plate in at least a vertical direction.

10. The backlight assembly of claim 9, wherein the light-emitting chip is a blue chip to generate blue light, and each of the LEDs further comprises a yellow fluorescent substance in the opening portion, to convert a portion of the blue light generated by the light-emitting chip into yellow light.

11. The backlight assembly of claim 10, wherein the yellow fluorescent substance comprises one or more substances selected from the group consisting of the YAG series, silicate series and TAG series.

12. The backlight assembly of claim 9, wherein the light-emitting chip is a blue chip to generate blue light, and each of the LEDs further comprises a red fluorescent substance and a green fluorescent substance in the opening portion, the red fluorescent substance to convert a portion of the blue light into red light and the green fluorescent substance to convert a portion of the blue light into green light so that white light is generated by mixing the blue light, the red light and the green light.

13. The backlight assembly of claim 12, wherein the red fluorescent substance comprises one or more substances selected from the group consisting of SrS:Eu, (Sr,Ca)S:Eu, CaS:Eu, (Sr,Ca)GeS:Eu and CaAlSiN$_3$.

14. The backlight assembly of claim 12, wherein the green fluorescent substance comprises one or more substances selected from the group consisting of SrGa$_2$S$_4$:Eu and (Ba,Sr,Ca)$_2$SiO$_4$:Eu.

15. The backlight assembly of claim 9, wherein the PCB is vertically disposed to face the incidence surface and the light-emitting chip emits light toward the incidence surface.

16. The backlight assembly of claim 15, wherein the PCB has a width that is substantially equal to or less than a height of the incidence surface of the light guide plate.

17. The backlight assembly of claim 16, wherein the LED has a size substantially equal to or smaller than a width of the PCB.

18. The backlight assembly of claim 9, wherein the lower portion of the lead frame has an area of about 20% to 70% of a total area of the bottom surface of the housing.

19. A liquid crystal display (LCD) apparatus comprising:

a display unit including an LCD panel to display an image; and a backlight assembly to provide the LCD panel with light, wherein the backlight assembly comprises:

a light guide plate; and a light-emitting module disposed to face an incidence surface of the light guide plate, the light-emitting module including a printed circuit board (PCB) vertically disposed to face the incidence surface and a plurality of light-emitting diodes (LEDs) mounted on the PCB to emit light toward the incidence surface, each of the LEDs including a blue chip to emit blue light, and a red fluorescent substance and a green fluorescent substance to convert the blue light into white light, wherein light emitted from the LEDs is directly incident on the entire incidence surface of the light guide plate in at least a vertical direction.

20. A liquid crystal display (LCD) apparatus comprising:

a display unit including an LCD panel to display an image; and a backlight assembly to provide the LCD panel with light, wherein the backlight assembly comprises:

a light guide plate; and a light-emitting module disposed to face an incidence surface of the light guide plate, the light-emitting module including a PCB and a plurality of light-emitting diodes (LEDs) mounted on the PCB to emit light toward the incidence surface of the light guide plate, wherein each of the LEDs has a light-emitting chip, a lead frame electrically connected to the PCB to apply electric power to the light-emitting chip, and a housing covering the lead frame and having an opening portion exposing the light-emitting chip, the lead frame has a chip-mounting portion on which the blue chip is mounted, a side portion extended from the chip-mounting portion to be disposed at a side face of the housing, and a lower portion extended from the side portion and bent to be disposed at a bottom face of the housing, the lower portion being larger than the side portion in area, and wherein light emitted from the LEDs is directly incident on the entire incidence surface of the light guide plate in at least a vertical direction.

* * * * *